Figure 1:
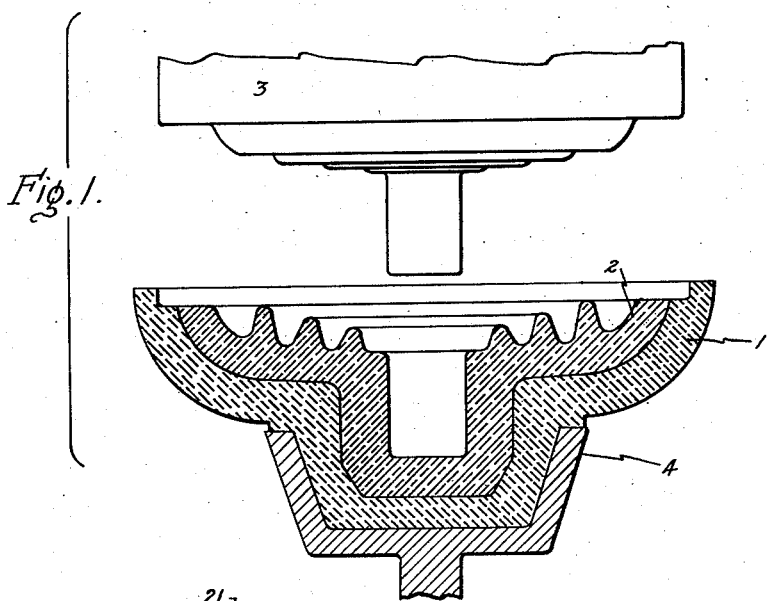

Oct. 15, 1957 L. E. THIESS 2,809,898
POROUS CERAMIC MOLD AND METHOD OF MAKING SAME
Filed Feb. 16, 1954

Inventor
Ludwig E. Thiess,
by Gilbert P. Tarleton
His Attorney.

United States Patent Office 2,809,898
Patented Oct. 15, 1957

2,809,898

POROUS CERAMIC MOLD AND METHOD OF MAKING SAME

Ludwig E. Thiess, Baltimore, Md., assignor to General Electric Company, a corporation of New York Application February 16, 1954, Serial No. 410,562

3 Claims. (Cl. 106—38.9)

This invention relates to a porous ceramic mold, and more particularly, to a permanent porous ceramic mold for forming ceramic parts as porcelain electrical insulators and pottery, and to a method of making same.

It has for many years been the practice in the ceramic industry to use plaster of Paris molds in which high voltage porcelain insulators are formed by using hot plastic pressing or other methods. One of the reasons the molds have been made of plaster of Paris was to provide sufficient porosity or moisture absorption capacity so that moisture would be absorbed by the mold from the piece being formed thus permitting the piece to shrink free from the mold and be easily removed from the mold. While plaster of Paris molds have served this purpose sufficiently, they have a number of disadvantages. For instance, plaster of Paris molds are relatively frail, easily damaged, and quickly worn out. Sulphates from the plaster of Paris molds are sometimes carried over into the surface of the ceramic part being formed making it necessary to trim the molded part in order to remove the surface area thereof which was in contact with the plaster of Paris mold. Also, when plaster of Paris molds become moisture saturated they cannot be quickly dried because of the temperature limit to which plaster of Paris may not be raised without destroying it. Furthermore, in order to make the plaster of Paris molds sufficiently strong for the hot plastic pressing of ceramic parts, the plaster of Paris molds must be relatively heavy and thick-walled making the handling of same not too convenient. Also, despite the fact that plaster of Paris molds have been used for many years in the ceramic industry because of their porosity or moisture absorption capacity, controlling the pore volume of plaster of Paris molds is a relatively difficult and not very accurate operation.

Accordingly, it is an object of this invention to provide a porous ceramic mold which will overcome the aforementioned disadvantages of plaster of Paris molds; and it is a further object of this invention to provide a method of making same.

My invention comprises a porous ceramic mold having an alumina-clay mixture which will overcome the aforementioned disadvantages of plaster of Paris molds; and my invention further comprises a method of making same.

My invention further comprises a permanent porous ceramic mold having 55 to 35% clay and 45 to 65% alumina by weight, said mold having a pore volume of 36 to 48% and a moisture absorption capacity of 24 to 34% by weight, said mold having a permissible firing temperature of about 2300° F. and a fired tensile strength of about 580 p. s. i.

My invention further comprises a method of forming a porous ceramic mold comprising adding a suitable liquid, as water, to a 55 to 35% clay and 45 to 65% calcined alumina by weight mixture to obtain a 1.83 to 1.85 specific gravity clay-alumina liquid casting mixture, controlling the grain size of said calcined alumina whereby approximately 50% of said calcined alumina is coarser than a 100 mesh ASTM standard screen while the remainder is finer than said 50%, pouring said liquid mixture into a suitable mold, as a plaster of Paris mold, permitting said poured liquid mixture to solidify, and then, after sufficient drying, firing the cast article to permanent hardness at a temperature of about 2300° F.

My invention further comprises a permanent porous ceramic mold having 25 to 27% ball clay, 10 to 28% china clay, and 65 to 45% calcined alumina by weight, said ceramic mold having a moisture absorption capacity of 24 to 34% by weight and said ceramic mold having a tensile strength of about 580 p. s. i.

My invention will be better understood from the following description taken in connection with the accompanying drawing, and its scope will be pointed out in the appended claims.

Figure 2:
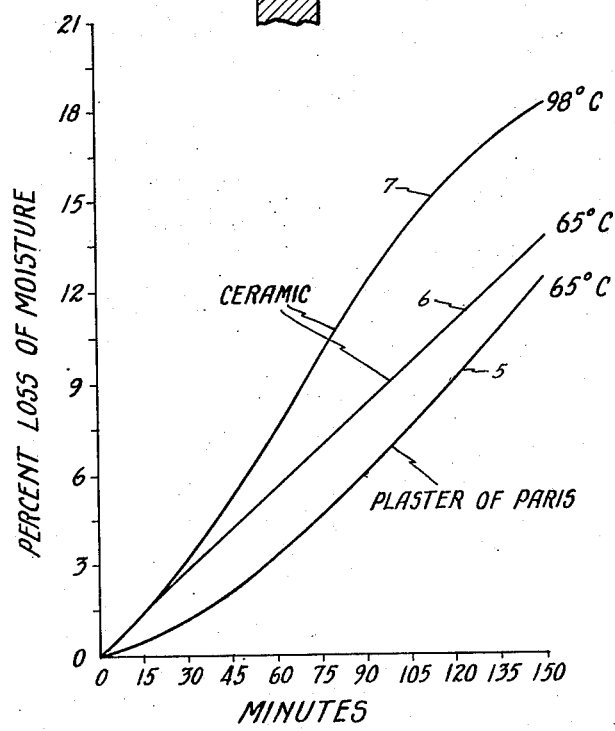

In the drawing, Fig. 1 is a sectional elevation view of one form of permanent porous ceramic mold constructed in accordance with my invention. Fig. 2 is a graphic comparison of the rate of drying of a permanent ceramic mold constructed in accordance with my invention, and a plaster of Paris mold.

Referring now to the drawing, and more particularly to Fig. 1, shown therein is a permanent porous ceramic mold 1 constructed in accordance with my invention while being used for the hot plastic pressing of a high voltage porcelain insulator 2. As will be obvious to those skilled in the art, in order for the hot voltage high pressure porcelain insulator to be readily removed from the mold, it is desirable that the mold have a high moisture absorption capacity whereby it will absorb moisture from the hot plastic pressed high voltage porcelain insulator wherein the insulator will shrink and thereby facilitate quick and convenient removal of the insulator from the mold. The mold preferably should not flake or chip away. Otherwise, particles of the mold will become embedded in the formed insulator necessitating machining of the exterior surfaces of the insulator to remove said particles. During the hot plastic pressing of a porcelain insulator into the ultimate form shown as high voltage insulator 2 high compressive and tensile forces are applied to the mold 1 by die member 3 and supporting steel cup 4. Accordingly, it is necessary for the mold to be sufficiently strong to withstand said high compressive and tensile forces if said mold is to be used in forming still more high voltage porcelain insulators. If said molds are not constructed so as to have a long life, new molds must be provided for the formation of additional high voltage porcelain insulators thereby increasing the manufacturing costs of the porcelain insulators. However, the mold should not be so heavy and thick-walled as to make the handling thereof inconvenient and cumbersome. After one porcelain insulator has been formed in a mold inasmuch as the mold has absorbed some moisture from the formed porcelain insulator the mold may be dried before it can be used again to form another porcelain insulator. The higher the temperature to which the mold can be heated during drying, the shorter is the drying time, thereby reducing the cost of manufacturing electrical insulators inasmuch as the mold will be more quickly available for the formation of additional insulators.

In my invention the permanent ceramic mold 1 shown in Fig. 1 has the following composition by weight: ball clay 25 to 27%, china clay 10 to 28%, and calcined alumina 65 to 45%. Ball clay is a highly plastic, fine grained hydrated aluminum silicate, whereas china clay is a less plastic, rather coarse grained hydrated aluminum silicate.

The porosity or moisture absorption capacity of fired ceramic molds manufactured according to the above-mentioned composition range varies from 24 to 34% by weight dependent upon the amount and the grain size of the calcined alumina. Therefore, the calcined alumina should have a controlled grain size. I have found that best results are obtained if approximately 50% of the alumina is coarser than a 100 mesh ASTM standard screen, while the remainder of the alumina may be as fine as a 200 mesh ASTM standard screen. Tests show that a 27% ball clay, 28% china clay, and 45% alumina mixture has a moisture absorption capacity of about 24%; and a 27% ball clay, 23% china clay and 50% alumina mixture has a moisture capacity of about 30%; while a 25% ball clay, 10% china clay, and 65% alumina mixture has a moisture capacity of about 34%.

The pore volume or percent of the total surface outline mold volume occupied by minute air cells or pockets of fired ceramic molds having the aforementioned composition range varies between 36 and 48%. This is a finer degree of control of the pore volume than is obtainable with plaster of Paris molds. The controlled pore volume is obtained by a careful selection of the grain size of the raw materials. Also, my ceramic molds have an average increased tensile strength of about 50% over equivalent molds made from plaster of Paris. This higher strength of my molds makes it possible to reduce the weight of production molds used for the plastic pressing of insulators to about 14 pounds while a plaster of Paris mold used to shape an identical insulator weighs about 24 pounds. This reduction in weight results in greater ease of handling of the mold and faster removal of the moisture absorbed by the mold inasmuch as the mold walls in my invention need not be as thick as the mold walls of plaster of Paris molds. This comparatively quicker rate of drying is graphically illustrated in Fig. 2. In Fig. 2, line 5 represents the rate of drying of a plaster of Paris mold at the maximum permissible drying temperature for plaster of Paris of 65° C. Line 6 represents the rate of drying of molds constructed in accordance with my invention at 65° C. A comparison of lines 5 and 6 will show that a mold constructed in accordance with my invention has a considerably faster drying rate than an equivalent plaster of Paris mold. Furthermore, my mold may be dried at a higher temperature than would be permissible with plaster of Paris. Line 7 illustrates the drying rate of my mold at a temperature of about 98° C. Plaster of Paris dried at 98° C. would be completely dehydrated and possibly destroyed.

While conventional plaster of Paris molds are subject to deterioration with continuous use, ceramic molds constructed in accordance with my invention are permanent and non-wearing, and therefore, will last almost indefinitely. Plaster of Paris molds will chip and wear on the surface, and consequently, chips or flakes of plaster of Paris will often become embedded in the porcelain piece being molded in the plaster of Paris mold, causing manufacturing losses and glaze defects. Such embedded plaster of Paris flakes or chips can sometimes be removed by machining the exterior surface of the porcelain piece, however this increases the manufacturing costs. With the use of my permanent porous ceramic molds such defects as flaking and chipping are substantially completely eliminated.

A preferred composition for a permanent porous ceramic mold consists of by weight: 18% dark, highly plastic, coarse grained, hydrated aluminum silicate, as Tennessee dark ball clay; 9% light, highly plastic, fine grained, hydrated aluminum silicate, as Kentucky ball clay; 23% china clay, as a fractionated Georgia china clay or an English china clay; and 50% calcined alumina.

The porosity or water absorption capacity of the above-mentioned preferred mixture after firing at about 2300° F. is about 30% by weight. Mechanical strength tests show that a mold having the above-mentioned preferred composition has a tensile strength of about 580 p. s. i. as against that of 350–400 p. s. i. for conventional plaster of Paris.

My ceramic mold compositions have the appearance of Paris and are white in color. The conventional plaster of Paris molds have a moisture absorption capacity of about 24 to 27% by weight, whereas my ceramic mold compositions have an increased moisture absorption capacity of 24 to 34% by weight. Furthermore, my ceramic mold compositions have better machining characteristics than the heretofore used plaster of Paris molds.

One method employed in making my permanent porous ceramic molds may be a cast process, whereby a clay-alumina water mixture is poured into a mold and allowed to solidify. The specific gravity of the liquid mixture is controlled to be between 1.83 and 1.85. After the poured liquid mixture has solidified, the solidified mixture is fired to permanent hardness in a pottery oven or kiln at a temperature of approximately 2300° F.

My permanent porous molds may also be manufactured by what is known in the art as a dry pressing process. Said dry pressing process comprises mixing powdered clays and calcined alumina having a grain size similar to that heretofore mentioned with about 17% water. Such dampened powdered clay-alumina mixture is pressed in steel molds at a pressure of approximately one ton per square inch. Then the press-formed molds are first dried at room temperatures or in dryers at about 140° F. and then fired in pottery kilns or ovens to approximately 2300° F. to obtain the desired hardness. The amount of calcined alumina that can be used in such dry pressed process may vary from 90 to 30% in weight, whereas the amount of clay may vary from 10 to 70% by weight. Inasmuch as the pieces are pressed under high pressures in the dry pressing process, the amount of clay used can be lower than in the heretofore mentioned casting process.

While there have been shown and described particular embodiments of my invention, it will be obvious to those skilled in the art that changes and modifications may be made without departing from the invention, and that it is intended by the appended claims to cover all such changes and modifications as fall within the true spirit and scope of the invention.

What I claim as new and desire to secure by Letters Patent of the United States is:

1. A permanent porous ceramic mold consisting essentially of 25 to 27% ball clay, 10 to 28% china clay, and 65 to 45% calcined alumina by weight, said ceramic mold having a pore volume of 36 to 48% and a moisture absorption capacity of 24 to 34% by weight, and said ceramic mold having a tensile strength of about 580 p. s. i.

2. A permanent porous ceramic mold consisting essentially of 18% Tennessee dark ball clay, 9% Kentucky ball clay, 23% Georgia china clay, and 50% calcined alumina by weight, said ceramic mold having a pore volume of between 36 to 48%, a moisture absorption capacity of between 24 to 34% by weight and a permissible drying temperature as high as 98° C., and said ceramic mold having a tensile strength of about 580 p. s. i.

3. A porous ceramic manufactured from an aqueous mixture consisting essentially of 25 to 27% ball clay, 10 to 28% china clay, and 65 to 45% calcined alumina by dry weight fired at a temperature of about 2300° F., about 50% of said calcined alumina having a grain size coarser than a 100 mesh ASTM standard screen and the remainder of said calcined alumina being as fine as a 200 mesh ASTM standard screen, said ceramic having a pore volume of about 36 to 48% and a moisture absorption capacity of about 24 to 34% by weight, and said ceramic having a tensile strength of about 580 p. s. i.

References Cited in the file of this patent

UNITED STATES PATENTS

| | | |
|---|---|---|
| 1,439,286 | Beecher | Dec. 19, 1922 |
| 1,476,001 | McIntosh | Dec. 4, 1923 |
| 1,882,701 | Alley | Oct. 18, 1932 |
| 2,441,695 | Feagin et al. | May 18, 1948 |
| 2,675,324 | Busby et al. | Apr. 13, 1954 |
| 2,682,692 | Kohl | July 6, 1954 |